UNITED STATES PATENT OFFICE 2,269,193

DENATURED ALCOHOL CONTAINING AN ALKYL CARBONATE

Louis J. Figg, Jr., and James W. Rhea, Kingsport, Tenn., assignors to Eastman Kodak Company, Rochester, N. Y., a corporation of New Jersey No Drawing. Application November 8, 1940, Serial No. 364,884

4 Claims. (Cl. 252—366)

This invention relates to the denaturing of ethyl alcohol, and to alcohol so denatured.

It is an object of our invention to provide a denaturant which will render ethyl alcohol containing it unfit for use as a beverage, which cannot be economically removed from the alcohol by any known methods, which will not render the alcohol unfit for industrial uses in which denatured alcohol has customarily been employed, and which will be free from methanol. Other objects will hereinafter appear.

We have discovered that a dialkyl carbonate in which each alkyl group contains less than four carbon atoms is an effective denaturant for alcohol. Examples of these dialkyl carbonates are:

| | Boiling point, °C. |
|---|---|
| Dimethyl carbonate | 91 |
| Methyl ethyl carbonate | 109 |
| Diethyl carbonate | 126 |
| Methyl propyl carbonate | 131 |
| Dipropyl carbonate | 168.5 |

In denaturing ethyl alcohol with our novel denaturants, we may use from 0.5 to 5 parts of the dialkyl carbonate, or even more, per 100 parts of 95% alcohol. These dialkyl carbonates may be used alone in denaturing, or they may be used in conjunction with denaturing materials derived from the destructive distillation of hardwood, such as those which are described in United States Patents 1,975,090; 1,975,091, and 1,975,092. Likewise, they may be used in conjunction with any other denaturants with which they may be found to be compatible.

When an attempt is made to remove a dialkyl carbonate from alcohol by distilling with alkali, it is found that when alkali is added to the denatured alcohol, a heavy, white precipitate is formed. This precipitate has a blanketing effect on the liquid that prevents efficient distillation by holding back the alcohol. This feature, combined with the taste imparted to the alcohol by the dialkyl carbonates, makes them very efficient denaturants for ethyl alcohol.

What we claim as our invention and desire to be secured by Letters Patent of the United States is:

1. Industrial ethyl alcohol denatured with 0.5 to 5 parts of a dialkyl carbonate in which each alkyl group contains less than four carbon atoms, as an essential denaturing element, per 100 parts of 95% ethyl alcohol.

2. Industrial ethyl alcohol denatured with 0.5 to 5 parts of dimethyl carbonate, as an essential denaturing element, per 100 parts of 95% ethyl alcohol.

3. Industrial ethyl alcohol denatured with 0.5 to 5 parts of diethyl carbonate, as an essential denaturing element, per 100 parts of 95% ethyl alcohol.

4. Industrial ethyl alcohol denatured with 0.5 to 5 parts of a dipropyl carbonate, as an essential denaturing element, per 100 parts of 95% ethyl alcohol.

LOUIS J. FIGG, Jr.
JAMES W. RHEA.